(12) United States Patent
Mckillican et al.

(10) Patent No.: US 12,712,475 B2
(45) Date of Patent: Aug. 18, 2026

(54) UNDER-SPEED DETECTION IN A VARIABLE-SPEED POWER TOOL

(71) Applicant: Black & Decker Inc., New Britain, CT (US)

(72) Inventors: Jason D. Mckillican, Baltimore, MD (US); Sona R. Mathew, Towson, MD (US); Jason Thrush, Baltimore, MD (US); Alexander P. Davidson, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 152 days.

(21) Appl. No.: 18/624,430

(22) Filed: Apr. 2, 2024

(65) Prior Publication Data

US 2024/0250623 A1 Jul. 25, 2024

Related U.S. Application Data

(63) Continuation of application No. 17/739,617, filed on May 9, 2022, now Pat. No. 11,973,451.

(Continued)

(51) Int. Cl.
*H02P 3/06* (2006.01)
*H02P 23/00* (2016.01)

(52) U.S. Cl.
CPC ................ *H02P 3/06* (2013.01); *H02P 23/00* (2013.01)

(58) Field of Classification Search
CPC . B25F 5/00; B25F 5/001; B25B 21/00; B25B 23/147; B25B 21/02; H02H 7/093;

(Continued)

(56) References Cited

U.S. PATENT DOCUMENTS 4,649,245 A 3/1987 Lessig, III et al.
4,734,629 A 3/1988 Lessig, III et al.

(Continued)

FOREIGN PATENT DOCUMENTS

DE 202014103265 U1 10/2014
DE 102020124821 A1 4/2021

(Continued)

OTHER PUBLICATIONS

"Iwata Kazutaka et al, Electric Rotating Tool, Control Method, and Program, Aug. 20, 2009, Clarivate Analytics , pp. 1-73". (Year: 2009).*

(Continued)

*Primary Examiner* — Antony M Paul
(74) *Attorney, Agent, or Firm* — Amir R. Rohani

(57) ABSTRACT

A method of operating a power tool having a motor and a controller is provided. The method includes: receiving a speed signal from a variable-speed input mechanism mounted on the power tool; determining a target speed of the motor corresponding to the speed signal; controlling a supply of power to the motor based on the target speed; determining an underspeed threshold corresponding to at least one of the target speed or the speed signal; determining a rotational speed of the motor; and interrupting a supply of power to the motor if the rotational speed of the motor meets a criterion in relation to the underspeed threshold.

14 Claims, 3 Drawing Sheets

Related U.S. Application Data

(60) Provisional application No. 63/186,885, filed on May 11, 2021.

(58) Field of Classification Search
CPC ........ H02P 21/18; H02P 29/024; H02P 29/10; H02P 6/08; H02P 23/00; H02P 3/06; H02P 2207/05; H02P 25/022; H02P 25/14; H02P 27/08; H02P 25/03; H02P 3/08; H02P 6/16; H02P 6/17; H02P 6/06; H02P 6/28; B25C 1/06; B25C 1/008; H02K 11/33; H02K 29/06
See application file for complete search history.

(56) References Cited

U.S. PATENT DOCUMENTS

| | | | | |
|---|---|---|---|---|
| 4,737,661 | A | 4/1988 | Lessig, III et al. | |
| 5,440,215 | A | 8/1995 | Gilmore | |
| 5,731,673 | A | 3/1998 | Gilmore | |
| 6,424,799 | B1 | 7/2002 | Gilmore | |
| 7,112,934 | B2 | 9/2006 | Gilmore | |
| 8,067,913 | B2 | 11/2011 | Watabe et al. | |
| 8,179,069 | B2 | 5/2012 | Matsunaga et al. | |
| 8,294,399 | B2 | 10/2012 | Suzuki et al. | |
| 8,552,669 | B2 | 10/2013 | Kusakawa | |
| 8,988,015 | B2 | 3/2015 | Forster et al. | |
| 9,312,795 | B2 | 4/2016 | Ishikawa et al. | |
| 9,314,908 | B2 | 4/2016 | Tanimoto et al. | |
| 10,637,379 | B2 | 4/2020 | Najjar et al. | |
| 2007/0000676 | A1 * | 1/2007 | Arimura | B25B 23/1405 173/179 |
| 2015/0256111 | A1 | 9/2015 | Forster et al. | |
| 2017/0373614 | A1 | 12/2017 | Lewis et al. | |

FOREIGN PATENT DOCUMENTS

| | | | | |
|---|---|---|---|---|
| EP | 2433757 | A2 | 3/2012 | |
| EP | 2558247 | A1 | 2/2013 | |
| EP | 2675592 | B1 | 2/2016 | |
| EP | 2979817 | A1 | 2/2016 | |
| EP | 2039479 | B1 | 3/2017 | |
| EP | 2564984 | B1 | 3/2017 | |
| EP | 3135438 | A1 | 3/2017 | |
| EP | 3235119 | A1 | 10/2017 | |
| EP | 3311958 | A1 | 4/2018 | |
| EP | 2127824 | B1 | 10/2019 | |
| WO | WO-2009102082 | A2 * | 8/2009 | B25F 5/00 |
| WO | 2016100879 | A1 | 6/2016 | |
| WO | 2019084280 | A1 | 5/2019 | |
| WO | 2020195322 | A1 | 10/2020 | |

OTHER PUBLICATIONS

EP EESR dated, Nov. 15, 2022, in corresponding EP application No. 22172344.8.

* cited by examiner

UNDER-SPEED DETECTION IN A VARIABLE-SPEED POWER TOOL

RELATED APPLICATION

This patent application is a continuation of U.S. application Ser. No. 17/739,617 filed May 9, 2022, which claims the benefit of U.S. Provisional Application No. 63/186,885 filed May 11, 2021, both of which are incorporated herein by reference in their entireties.

FIELD

This application relates to a variable-speed power tool, and in particular, to speed control in a variable-speed power tool.

SUMMARY

According to an embodiment, a method of operating a power tool having a motor and a controller is provided, the method comprising: receiving a position of a variable-speed input mechanism mounted on the power tool; determining a target speed of the motor corresponding to the position of the variable-speed input mechanism; determining an underspeed threshold corresponding to the target speed; determining a rotational speed of the motor; and interrupting a supply of power to the motor if the rotational speed of the motor is less than the underspeed threshold.

In an embodiment, the supply of power to the motor is interrupted if the rotational speed of the motor is less than the underspeed threshold for a predetermined period of time.

In an embodiment, the method further includes utilizing a timer that is incremented every time the rotational speed of the motor is less than the underspeed threshold, wherein the timer is reset every time a change in the position of the variable-speed input mechanism is detected.

In an embodiment, the timer is decremented every time the rotational speed of the motor is greater than or equal to the underspeed threshold.

In an embodiment, the method further includes: controlling the rotational speed of the motor in a closed-loop speed control if the position of the variable-speed input mechanism is greater than or equal to a threshold position, wherein the rotational speed of the motor is maintained at the target output speed even with increased torque; and controlling the rotational speed of the motor in an open-loop speed control if the position of the variable-speed input mechanism is not greater than or equal to the threshold position, wherein the rotational speed of the motor varies with increased torque.

In an embodiment, in closed-loop speed control, a pulse-width modulation (PWM) duty cycle for driving the motor is set according to the position and at least one of a measured current of the motor or a detected change in a rotational speed of the motor.

In an embodiment, the variable-speed input mechanism includes at least one of a trigger switch, a speed dial, a capacitive switch, or a touch-switch.

In an embodiment, the controller is configured to determine the target speed of the motor from a look-up table or a continuous equation, and calculate the underspeed threshold as a function of the target speed.

According to an embodiment, a power tool is provided including a housing, a motor disposed within the housing, a variable-speed input mechanism mounted on the housing, and a controller configured to control a supply of power from a power source to the motor. In an embodiment, the controller executes any combination of the aforementioned methods.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DESCRIPTION

Example embodiments will now be described more fully with reference to the accompanying drawings.

Figure 1:
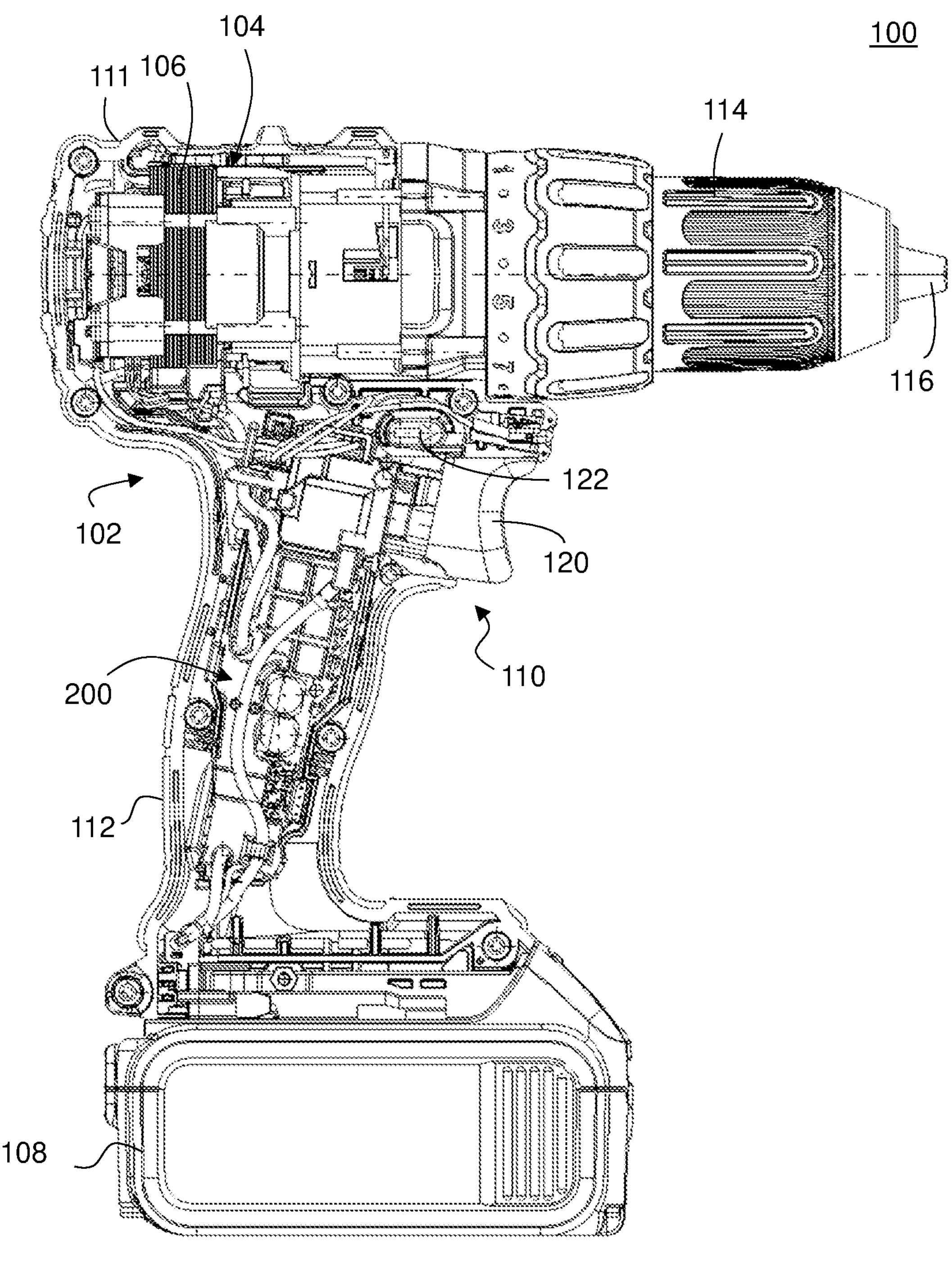
FIG. 1 depicts a longitudinal cross-sectional view of a power tool with a housing half removed, according to an embodiment.

With reference to the FIG. 1, a power tool 100 constructed in accordance with the teachings of the present disclosure is illustrated in a longitudinal cross-section view. Power tool 100 in the particular example provided may be a hand held dill, but it will be appreciated that the teachings of this disclosure is merely exemplary and the power tool of this invention could be any power tool. The power tool shown in FIG. 1 may include a housing 102, an electric motor 104, a battery receptacle for receiving a removable battery pack 108, a transmission assembly (gear case) 114, and an output spindle (not shown) driving a chuck 116. The gear case 114 may be removably coupled to the housing 102. The housing 102 can define a motor housing 111 and a handle 112.

According to an embodiment, motor 104 includes a stator 106 received in motor housing 111. Motor 104 maybe be any type of motor and may be powered by an appropriate power source. In an embodiment, the motor is a brushless DC electric motor including stator 106 and a rotor rotatably received within the stator 106, and is powered by battery pack 108.

According to an embodiment of the invention, power tool 100 further includes an integrated electronic switch and control module 200. Electronic control module 200, in an embodiment, may include a controller and electronic switching components for regulating the supply of power from the battery pack 108 to motor 106. In an embodiment, electronic control module 200 is disposed within the handle 112 below the motor housing 111, though it must be understood that depend on the power tool shape and specifications, electronic control module 200 may be disposed at any location within the power tool. Electronic control module may also integrally include components to support a user-actuated input unit 110 (hereinafter referred to as "input unit" 110) for receiving user functions, such as an on/off signal, variable-speed signal, and forward-reverse signal. In an embodiment, input unit 100 may include a variable-speed trigger 120, although other input mechanism such as a touch-sensor, a capacitive-sensor, a speed dial, etc. may also be utilized. In an embodiment, an on/off signal is generated upon initial actuation of the variable-speed trigger 120. In an embodiment, a forward/reverse button 122 is additionally provided on the tool 100. The forward/reverse button 122 may be pressed on either side of the tool in a forward, locked, or reverse position. In an embodiment, the associated circuitry and components of the input unit 110 that support the variable-speed trigger 120 and the forward/reverse button 122 may be fully or at least partially integrated into the electronic control module 200. Based on the input signals from the input unit 110 and associated components, the controller and electronic switching components of the electronic control module 200 modulate and regulate the supply of power from the battery pack 108 to motor 106. Details of the electronic control module 200 are discussed later in detail.

While in this embodiment, the power source is battery pack 108, it is envisioned that the teachings of this disclosures may be applied to a power tool with an AC power source. Such a power tool may include, for example, a rectifier circuit coupled to the AC power source.

It must be understood that, while FIG. 1 illustrates a power tool drill having a brushless motor, the teachings of this disclosure may be used in any power tool, including, but not limited to, drills, saws, nailers, fasteners, impact wrenches, grinders, sanders, cutters, etc. Also, teachings of this disclosure may be used in any other type of tool or product that include a rotary electric motor, including, but not limited to, mowers, string trimmers, vacuums, blowers, sweepers, edgers, etc.

The electronic control module 200 is described herein, according to an embodiment of the invention.

Figure 2:
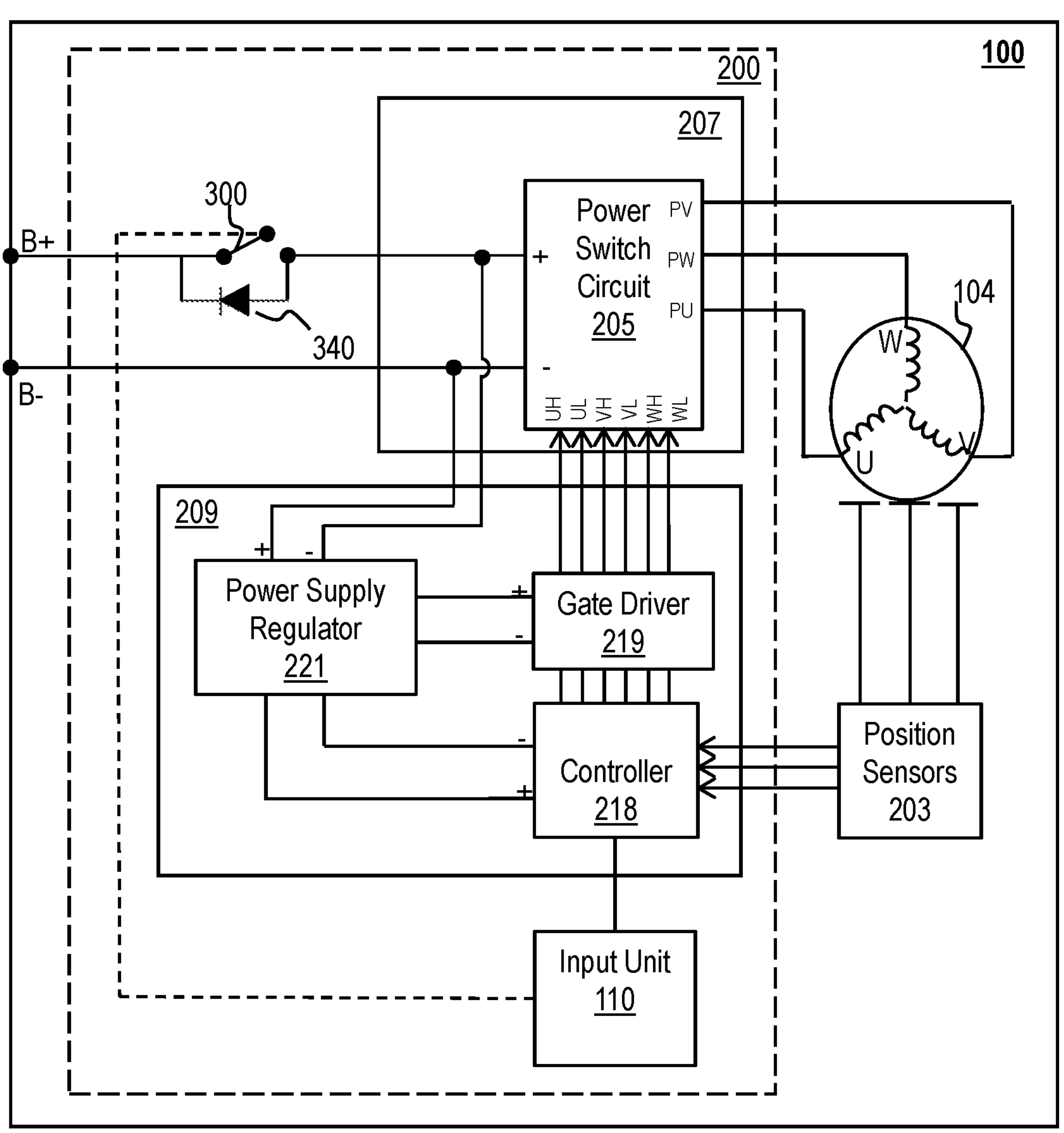
FIG. 2 depicts an exemplary block circuit diagram for an electronic control module for controlling the power tool motor, according to an embodiment.

Referring to FIG. 2, a circuit block diagram of power tool 100 including motor 104 and electronic control module 200 is depicted, according to an embodiment.

In an embodiment, electronic control module 200 includes the input unit 110, a power unit 207 and a control unit 209. In FIG. 2, power tool 100 received DC power from a DC power source such as a battery pack via B+ and B− terminals.

In an embodiment, power unit 207 may include a power switch circuit 205 coupled between the power source B+/B− terminals and motor windings to drive BLDC motor 104. In an embodiment, power switch circuit 205 may be a three-phase bridge driver circuit including six controllable semiconductor power devices (e.g. FETs, BJTs, IGBTs, etc.).

In an embodiment, control unit 209 may include a controller 218, a gate driver 219, and a power supply regulator 221. In an embodiment, controller 218 is a programmable device arranged to control a switching operation of the power devices in power switching circuit 226. In an embodiment, controller 218 receives rotor rotational position signals from a set of position sensors 203 provided in close proximity to the motor 104 rotor. In an embodiment, position sensors 203 may be Hall sensors. It should be noted, however, that other types of positional sensors may be alternatively utilized.

In an embodiment, controller 218 is activated by the input unit 110 upon the initial actuation of the trigger 120. The input unit 110 also provides a variable voltage signal indicative of the displacement of the trigger 120 to the controller 218. Based on the rotor rotational position signals from the position sensors 203 and the variable voltage signal, controller 218 outputs drive signals UH, VH, WH, UL, VL, and WL through the gate driver 219, which provides a voltage level needed to drive the gates of the semiconductor switches within the power switch circuit 205 in order to control a PWM switching operation of the power switch circuit 205.

In an embodiment, power supply regulator 221 may include one or more voltage regulators to step down the power supply to a voltage level compatible for operating the controller 218 and/or the gate driver 219. In an embodiment, power supply regulator 221 may include a buck converter and/or a linear regulator to reduce the power voltage of battery down to, for example, 15V for powering the gate driver 219, and down to, for example, 3.2V for powering the controller 218.

In an embodiment, electronic control module 200 includes components and circuitry associated with the user-actuated input unit 110. Such components may detect a movement of the trigger 120 and initiate a signal to turn on the controller and other components of electronic control module 200. In an example, as described in U.S. Pat. No. 9,508,498, content of which is incorporated herein by reference in its entirety, electronic control module 200 may include a series of conductive pads coupled to a series of resistors that output various voltages based on the position of a wiper coupled to the trigger switch. Upon initial engagement of the trigger switch, the output voltage signal (referred to as the WIPER signal in FIG. 12 of the '498 patent, and as the switch signal hereinafter) exhibits a prescribed change in voltage that, though associated circuitry, couples the controller to battery power supply and turns the controller on.

In an embodiment, the switch signal may be active high, meaning that a high voltage signal is generated on the switch signal when the trigger is pressed. Alternatively, and consistent with FIG. 12 of the '498 patent discussed above, the switch signal may be active low, meaning that the voltage signal on Switch Signal is normally a high voltage (e.g., equivalent to the battery voltage), that changes to a lower voltage amount when the trigger is pressed.

In an embodiment, electronic control module 200 is provided with a power contact switch 300 and a flyback diode 340 disposed in parallel to the power contact switch 300. Power contact switch 300 is a contact ON/OFF switch coupled to the trigger 120 and/or the input unit 110.

In an embodiment, as the trigger 120 is pressed, the output voltage signal from the conductive pads varies in correspondence to the amount of trigger pull. This controller 218 monitors the output voltage signal and determines the target speed of the motor 104 accordingly. The controller 218 controls the speed of the motor 104 by setting the PWM duty cycle of the power switch circuit 205 as a function of the target speed. This is typically done via a look-up table, where the trigger position is designated 10 discrete values ranging from the initial trigger position (1) to maximum trigger position (10), and PWM duty cycle is set incrementally as a function of the trigger position between 0% at the initial trigger position to 100% at the maximum trigger position. In an embodiment, additionally and or alternatively, the controller 218 may vary the conduction angle (i.e., conduction band) of the phases of the motor 104 in accordance with the trigger position.

In an embodiment, the speed of the motor 104 is controlled only as a function of the trigger position, in what is commonly known as open-loop speed control. In this scheme, as the increased torque on the motor demands higher current to be drawn from the power supply, the PWM duty cycle and/or the conduction band of the motor 104 is not varied by the controller 218. This cause the output speed to drop as torque increases. Alternatively, the speed of the motor 104 is controlled so as to maintain the target speed even as the torque varies, in what is commonly known as closed-loop speed control.

In an embodiment, closed-loop speed control is desirable particularly for high torque applications. However, in a variable-speed power tool, at low target speeds where the user has begun to press the trigger switch, the user should desirably be given the ability to get speed feedback for a given amount of trigger pull and judge whether a given application should be operated at a higher speed setting. Also, at very high torque, operating the motor with closed-loop speed control may cause the motor to be operated at high levels of duty cycle (e.g., even up to 100%) at very low trigger positions, whereas desirably high levels of duty cycle should be preferably achieved only at high speed settings.

According to an embodiment of the invention, to implement closed-loop speed control efficiently for variable-speed tools, closed-loop speed control is activated for an upper range of trigger positions and deactivated for a lower range of trigger positions. In an example, as shown in Table 1 below, at trigger positions 1-5, the motor 104 is run at open-loop, and closed-loop speed control is only activated at trigger positions 6-10. This allows the controller 218 to operate the motor 104 at closed-loop at high trigger positions to maintain constant speed at high torque without sacrificing the user experience at low trigger positions where speed feedback is desired.

Additionally, in many power tools, an underspeed shutdown protection is provided, where the controller 218 shuts down the tool if the duty cycle is at 100% and the output speed of the motor 104 is below a specified underspeed threshold. This indicates that the motor 104 is drawing too much current, but since the speed is too low, it is not performing its intended application effectively. For example, in some conventional power tools, the underspeed condition is detected at the last trigger position and, if the condition persists for a given period of time (e.g., 100 ms), the controller shuts down supply of power to the motor. This could open chances of failure when the tool is operating at lower than the maximum trigger position.

In an embodiment, to avoid nuisance shutdowns and provide a more robust and reliable underspeed provide protection scheme in variable-speed tools, discrete underspeed shutdown thresholds are provided corresponding to various trigger positions, as shown in Table 1 below. In an embodiment, the underspeed shutdown threshold is calculated as a function (e.g., 32%) of the target speed for the given trigger position. If the output speed of the motor falls below the underspeed shutdown threshold for a predetermined amount of time (e.g., 100 ms), the controller 218 deactivates the power switch circuit 205 to shut off flow of current to the motor 104.

TABLE 1

| Wiper Step (i.e., Trigger Position) | Target Speed | Commanded Duty | Underspeed Shutdown Threshold | Closed Loop Duty |
|---|---|---|---|---|
| 1. | 0 | 0 | 0 | Disabled |
| 2. | 1600 | 6% | 512 | Disabled |
| 3. | 1839 | 7% | 588 | Disabled |
| 4. | 3675 | 14% | 1176 | Disabled |
| 5. | 6007 | 22.9% | 1922 | Disabled |
| 6. | 8794 | 33.5% | 2814 | Enabled |
| 7. | 12007 | 45.8% | 3842 | Enabled |
| 8. | 15623 | 59.62% | 4999 | Enabled |
| 9. | 19624 | 74.9% | 6279 | Enabled |
| 10. | 26200 | 100% | 8384 | Enabled |

Figure 3:
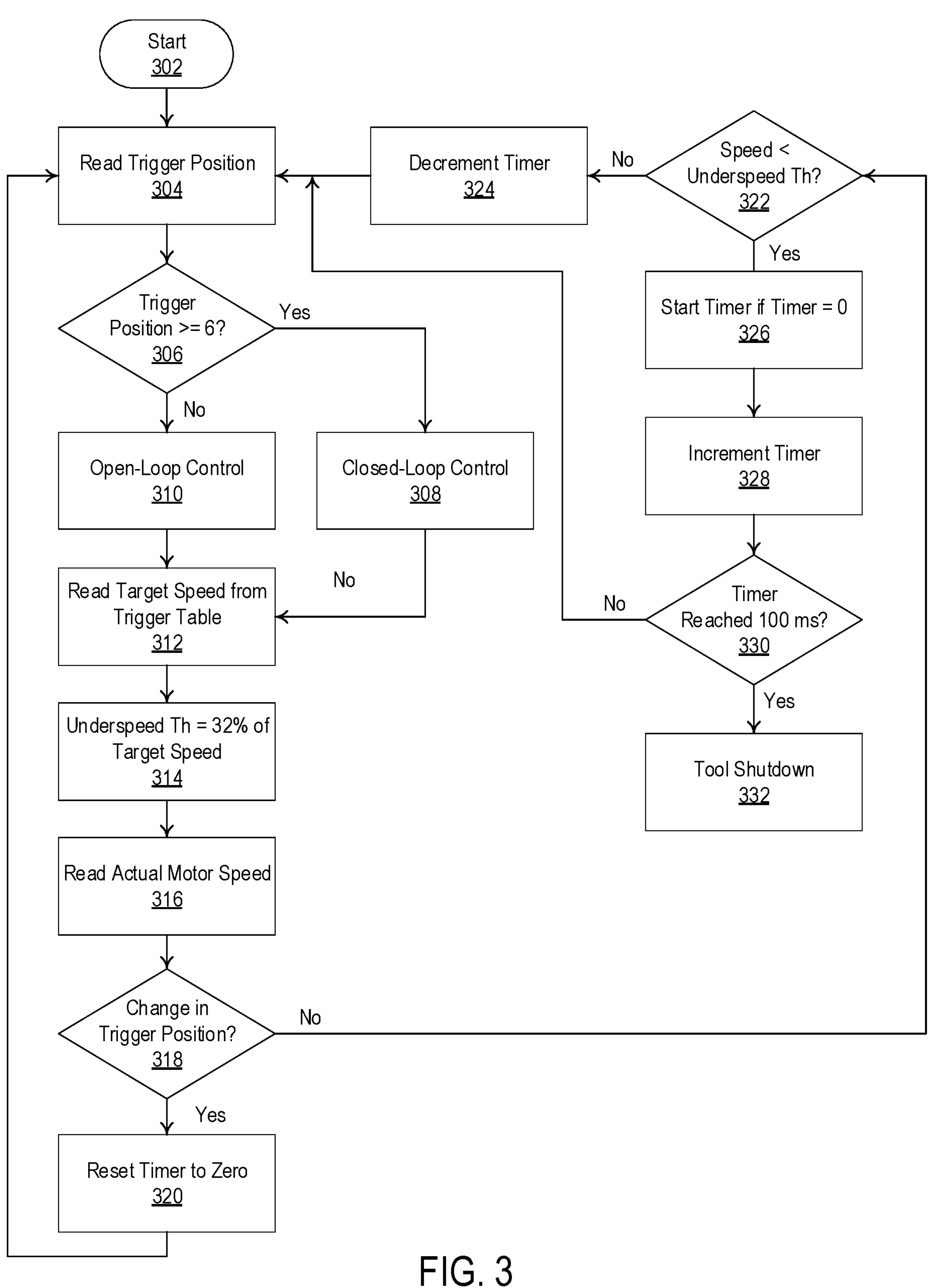
FIG. 3 depicts an exemplary flow diagram for controlling the speed of the power tool motor.

FIG. 3 depicts a flow diagram 300 executed by the controller 218 to execute the under-speed and closed-loop speed control method described above. In an embodiment, beginning in step 302, the current position of the trigger 120 is read at step 304. The trigger position is compared to a threshold value, in this example, 6 out of 10 steps, at step 306. If the trigger position is greater than or equal to the threshold value, the controller 218 executes closed-loop speed control at step 308. Otherwise, the controller 218 executes open-loop speed control at step 310.

In an embodiment, the controller 218 proceeds to read a target speed corresponding to the read trigger position from Table 1 at step 312 and operate the motor at a duty cycle corresponding to the target speed. The underspeed threshold is also read from Table 1 or calculated as a function (e.g., 32%) of the target speed at step 314. The actual motor speed is read via position sensors 203 or calculated via a known sensorless mechanism (e.g., by monitoring the back-emf voltage of the motor) at step 316.

In an embodiment, a timer is used by the controller 218 to interrupt power to the motor 104 if an undervoltage condition is detected for a predetermined amount of time, e.g. 100 ms. In an embodiment, to ensure that the motor 104 has had the necessary time to catch up to its target speed in the event the trigger position has gone through a change, the controller 218 determines whether the trigger position has changed since its previous evaluation at step 318. If a change in the trigger position is detected, the controller 218 resets the timer to zero at step 320 and returns to step 304. This ensures that the underspeed detection process is performed anew for any given trigger position. If no change in the trigger position is detected, the controller 218 proceeds to steps 322, where it compares the speed of the motor to the underspeed threshold. If the motor speed is greater than or equal to the underspeed threshold, the controller 218 decrements the timer (if the timer is already running) to a value no less than zero at step 324 and returns to step 304 where the process is repeated. However, if the motor speed is less than the underspeed threshold, the timer is started (if it is not already running) at step 326 and incremented at step 328. The timer is compared to the threshold time (e.g., 100 ms) at step 330. If the timer has reached the threshold time, the controller 218 determines that an underspeed condition has occurred for the given trigger position and shuts down flow of current to the motor 104 at step 332. Otherwise the process is repeated beginning at step 304. Incrementing the timer each time an underspeed condition is detected, and similarly decrementing the timer each time an underspeed condition is not detected, ensures that the motor 104 is only shut down when the underspeed condition is persistent, and not upon detection of sporadic and infrequent underspeed events.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A method of operating a power tool having a motor and a controller, the method comprising:

receiving a speed signal from a variable-speed input mechanism mounted on the power tool;

determining a target speed of the motor corresponding to the speed signal;

controlling a supply of power to the motor based on the target speed;

determining an underspeed threshold corresponding to at least one of the target speed or the speed signal;

determining a rotational speed of the motor;

interrupting a supply of power to the motor if the rotational speed of the motor meets a criterion in relation to the underspeed threshold;

controlling the rotational speed of the motor in a closed-loop speed control if the target speed is greater than or equal to a threshold target, wherein the rotational speed of the motor is maintained at the target speed even with increased torque; and controlling the rotational speed of the motor in an open-loop speed control if the target speed is not greater than or equal to the threshold target, wherein the rotational speed of the motor varies with increased torque.

2. The method of claim 1, wherein the supply of power to the motor is interrupted if the rotational speed of the motor is less than the underspeed threshold for a predetermined period of time.

3. The method of claim 2, further comprising utilizing a timer that is incremented every time the rotational speed of the motor is less than the underspeed threshold, wherein the timer is reset every time a change in the position of the variable-speed input mechanism is detected.

4. The method of claim 3, wherein the timer is decremented every time the rotational speed of the motor is greater than or equal to the underspeed threshold.

5. The method of claim 1, wherein in closed-loop speed control, a pulse-width modulation (PWM) duty cycle for driving the motor is set according to the target speed and at least one of a measured current of the motor or a detected change in a rotational speed of the motor.

6. The method of claim 1, wherein the variable-speed input mechanism includes at least one of a trigger switch, a speed dial, a capacitive switch, or a touch-switch.

7. A power tool comprising:

a housing;

a motor disposed within the housing;

a variable-speed input mechanism mounted on the housing; and a controller configured to receive a speed signal from the variable-speed input mechanism, determine a target speed of the motor corresponding to the speed signal, control a supply of power to the motor based on the target speed, determine an underspeed threshold corresponding to at least one of the target speed or the speed signal, determine a rotational speed of the motor, and interrupt the supply of power to the motor if the rotational speed of the motor meets a criterion in relation to the underspeed threshold, wherein the controller is further configure to control the rotational speed of the motor in a closed-loop speed control if the target speed is greater than or equal to a threshold target, wherein the rotational speed of the motor is maintained at the target speed even with increased torque; and control the rotational speed of the motor in an open-loop speed control if the target speed is not greater than or equal to the threshold target, wherein the rotational speed of the motor varies with increased torque.

8. The power tool of claim 7, wherein the supply of power to the motor is interrupted if the rotational speed of the motor is less than the underspeed threshold for a predetermined period of time.

9. The power tool of claim 8, wherein the controller utilizes a timer that is incremented every time the rotational speed of the motor is less than the underspeed threshold, wherein the timer is reset every time a change in the position of the variable-speed input mechanism is detected.

10. The power tool of claim 9, wherein the timer is decremented every time the rotational speed of the motor is greater than or equal to the underspeed threshold.

11. The power tool of claim 7, wherein in closed-loop speed control, a pulse-width modulation (PWM) duty cycle for driving the motor is set according to the target speed and at least one of a measured current of the motor or a detected change in a rotational speed of the motor.

12. The power tool of claim 7, wherein the variable-speed input mechanism includes at least one of a trigger switch, a speed dial, a capacitive switch, or a touch-switch.

13. The power tool of claim 7, wherein the controller is configured to determine the target speed of the motor based on the speed signal using a look-up table, and calculate the underspeed threshold as a function of the target speed.

14. A method of operating a power tool having a motor and a controller, the method comprising:

receiving a speed signal from a variable-speed input mechanism mounted on the power tool;

determining a target speed of the motor corresponding to the speed signal;

controlling a supply of power to the motor based on the target speed;

determining an underspeed threshold corresponding to at least one of the target speed or the speed signal;

determining a rotational speed of the motor; and interrupting a supply of power to the motor if the rotational speed of the motor is less than the underspeed threshold for a predetermined period of time by utilizing a timer, wherein the timer is incremented every time the rotational speed of the motor is less than the underspeed threshold, and the timer is reset every time a change in the position of the variable-speed input mechanism is detected.

* * * * *